3,284,308
PROCESS FOR THE STRATIFICATION OF A BODY OF LIQUID IN TWO SUPERPOSED LAYERS AND INSTALLATION FOR THE APPLICATION OF THE PROCESS
Jacques Dollfus, 49 Rue Jeanne d'Arc, Saint-Mande, France, and René Guilloteau, 169 Ave. Aristide Briand, Cachan, France
Filed Mar. 16, 1964, Ser. No. 352,204
Claims priority, application France, Mar. 26, 1963, 929,220
8 Claims. (Cl. 176—37)

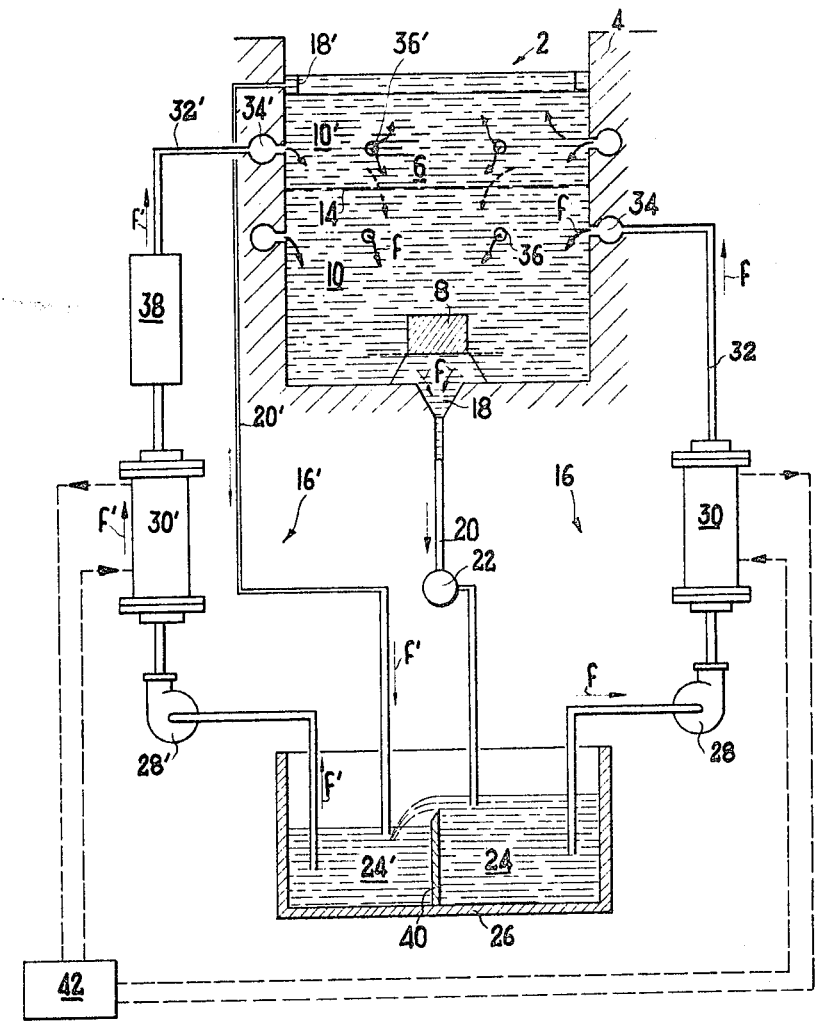

The present invention relates to a process for the stratification of a body of liquid in two superposed layers and an installation for the application of the process.

An important application of this invention is in the field of nuclear energy in which water is frequently employed as biological shielding material, for example, in swimming pool reactors wherein the water which covers the reactor core, in addition to its function as neutron moderator, shields the operators who are stationed above the pool; similarly, in those installations in which irradiated fuel elements are subjected to mechanical processing, the handling and processing operations are frequently carried out at the bottom of a tank which is filled with water, the depth of which is sufficient for the purpose of providing biological shielding.

When the radioactivity of materials which are disposed at the bottom of the body of water is at a high level, it is necessary to take precautions in order to prevent the activated or contaminated water from rising to the surface. Accordingly, in swimming pool reactors with a power level of over 1 mw., the water which is drawn-off through the core so as to cool this latter must be decontaminated prior to being cooled and returned to the pool. The problem is of course made worse by the heating of the irradiated water which tends to cause this latter to rise to the surface. The decontamination process can be carried out by a number of different methods. The most common among these consists in eliminating the short-lived radioactive products (oxygen, nitrogen) by permitting the water which is drawn-off to stand for a few minutes in a holdup tank of sufficient capacity and by retaining the activated mineral products in an ion exchanger.

When the power level reaches approximately 5 mw., this precaution is actually inadequate and it becomes necessary to maintain at the surface a layer of decontaminated water which is separated from the body of water surrounding the core by a relatively well-defined interface. Said interface can be formed by bringing the two layers to different temperatures. But the processes of diffusion and extraneous agitation have a tendency to equalize the temperatures in the two layers and the diffusion of the bottom layer towards the top layer tends to cause the rapid pollution of this latter. Up to the present time, the mixing or diffusion of superposed layers through the interface has been avoided by providing a transverse partition, usually of transparent material, which forms the interface and limits exchanges by diffusion, and by maintaining the water of the top layer at a temperature which is slightly higher than that of the contaminated water within the layer which is located beneath the partition.

Unfortunately, the use of a partition, even when transparent and consisting of a series of separately removable panels, destroys one of the essential advantages of water as biological shielding material, inasmuch as it precludes the possibility of introducing tools within the tank and moving such tools without difficulty.

The present invention is directed to the basic concept of a process for preventing the mixing of superposed layers without the use of a partition and above all for preventing the diffusion of the layer of contaminated water in the other layer. The main principle of this process consists in causing the liquid of the two layers to circulate in a continuous manner while maintaining a suitable temperature difference between the flows of water which are delivered into the two layers and in delivering into the top layer a slight excess flow which passes into the bottom layer.

The process in accordance with the invention consists in withdrawing water from the bottom layer, in cooling said water and reinjecting it into the bottom layer, in withdrawing water from the top and bottom layers, in decontaminating said water, in bringing said water to a temperature which is higher than that of the water which is reinjected into the bottom layer and in reinjecting it into the top layer.

A preferred device for the practical application of the invention comprises an open vessel containing the body of liquid, a first circulation system comprising means for returning the greater part of said liquid into said bottom portion, communication means whereby that part of the flow which has not been returned is transferred to a second circulation system, said second circulation system comprising means for withdrawing liquid from the top portion of the vessel, a device for decontaminating the entire quantity of liquid which is withdrawn from the bottom portion and means for returning said entire quantity of liquid into said top portion, one and/or the other of the two circulation systems being provided with heat-exchanging means for bringing the liquid which is returned to the top portion to a temperature which is higher than that of the liquid which is returned to the bottom portion.

The invention will be more clearly understood by consideration of the description which follows below in connection with one mode of practical application which is given by way of non-limitative example. The description refers to the single accompanying figure in which are shown diagrammatically a tank and the circulation systems which are associated therewith.

The figure shows in cross-section taken on a vertical plane a tank 2 which is arranged within a concrete shield structure 4 and which is occupied by a body of water 6. There is located at the bottom of the tank a radioactive equipment unit 8 which can be, for example, the core of a swimming-pool reactor or an installation for processing irradiated fuel.

The object of the invention is to separate the body of water 6 into two layers 10 and 10' having slightly different temperatures and therefore slightly different densities, and having an interface which is shown diagrammatically by the broken line 14. It will be apparent that the said interface does not have an extremely sharp definition but is represented by a zone in which the temperature gradient is distinctly higher than in the remainder of the body of water.

The stratification process is accomplished by means of a system consisting of a first circulation system 16 which will be designated hereinafter as the polluted water circuit (in which the circulation takes place in the direction of the arrows f) and a second circulation system 16' which will be designated hereinafter as the decontaminated water circuit (in which the circulation takes place in the direction of the arrows f').

The polluted water circuit 16 communicates with the bottom of the pool through an opening 18 connected to a conduit 20 which can be fitted with a gate-valve or any suitable flow-regulating device 22. The water which is derived from the layer 10 flows into a first compartment 24 of a holdup tank 26. A pump 28 draws up the water from the compartment 24 and returns it through a heat exchanger 30 and a conduit 32 to a collector 34. From this point the polluted water flows into the bottom layer 10 through a series of openings or nozzles such as the nozzle 36 which are placed slightly below the interface to be formed. As will be understood, the openings 36 are spaced apart and arranged in such a manner as not to create within the body of water high-velocity currents which would generate vortical flow patterns or eddies and thus increase the diffusion of one layer within the other.

The elements of a decontaminated water circuit 16' which correspond to those of the polluted water circuit 16 are designated by the same reference numeral to which is assigned the prime index. The initial portion of the circuit 16' which is located within the top layer is constituted by a surface channel 18' which forms a thin-edged weir and which also regularizes the level of the water within the tank whenever this proves necessary. The water which is withdrawn is conveyed through a conduit 20' to a second compartment 24' of the holdup tank 26. A pump 28' draws the water up from the compartment 24' and delivers it through a heat exchanger 30 and a decontamination apparatus 38 to a collector 34'. The decontamination apparatus consists, for example, of a demineralization system of the ion-exchange resin type which can be associated with other deactivation systems. From the collector 34', the water flows into the top layer through a series of openings such as the opening 36' which are arranged as in the case of the openings 36 in such a manner as to prevent the formation of turbulent flow patterns.

Provision is made between the two compartments 24 and 24' of the holdup tank 26 for a communication device which permits a small proportion of the flow circulating within the circuit 16 to be transferred into the circuit 16'. In the form of embodiment which is illustrated, this communication is provided by a thin-walled weir 40. The adjustment of the output of the pump 28 and/or of the opening of the device 22 makes it possible to establish the head on the crest of the weir and consequently the volume discharged from the polluted water circuit into the decontaminated water circuit.

The heat exchangers 30 and 30' are coupled in such a manner as to maintain a suitable temperature difference between the flows of water which are returned to the two layers 10 and 10'. In the form of embodiment which is illustrated, this temperature difference is controlled by means of a thermal pump 42 fitted with a regulator of any suitable type and which provides the means of transferring to the heat exchanger 30' the heat which is removed from the heat exchanger 30. This solution is appropriate in cases when the heating of the water of the layer 10 by the equipment unit which is located at the bottom of the body of water remains at a low value. In other cases, it may prove necessary to associate with the pump a secondary heat exchanger which serves to cool the water within the heat exchanger 30 to a greater extent than is permitted by the transfer of heat to the heat exchanger 30'. In other cases, the heat exchanger 30 can be dispensed with by effecting the temperature-difference control in circuit 16 alone.

The withdrawal of polluted water must of course be carried into effect preferably in the zones themselves in which said water is irradiated, that is to say in the vicinity of the radioactive equipment unit 8 which is located at the bottom of the tank. As will be apparent, it is possible by means of deflector walls, for example, to cause the water to be drawn towards the opening in such a manner as to cool the equipment unit 8. This solution will be adopted, for example, for the purpose of cooling the core of a swimming-pool reactor.

The method employed follows from the foregoing description. Accordingly, the water which is withdrawn from the bottom layer in proximity to the radioactive equipment unit is recycled in said layer after withdrawal of part of the water which is mixed with water withdrawn from the top layer; this mixture is decontaminated, brought to a temperature which is higher than that of the recycled water, then reinjected into the top layer, while the temperature difference can be created by removing from the water which is recycled in the bottom layer the quantity of heat which is necessary for the purpose of increasing the temperature of the water which is reinjected into the top layer.

By virtue of the excess flow which arrives in the top layer, the diffusion through the interface takes place towards the bottom layer and prevents the contaminated water from rising to the surface.

If there is no occurrence of any extraneous process (convection current produced by heating, mechanical agitation resulting, for example, from the manipulation of tools placed in the tank), then in that case only a very small temperature difference is necessary in order to maintain the division in two layers. By way of example, a temperature difference of 0.1° C. has been found sufficient to maintain the pollution of the top layer at approximately $\frac{1}{100}$ of the bottom layer within a tank of 100 m.$^3$ capacity with a pump discharge rate of approximately 5 m.$^3$ per hour.

When provision has to be made for mechanical agitation, it is of course necessary to maintain higher temperature differences, usually of a few degrees.

It will be understood that the present invention is not limited to the process and device which have been described by way of example and that all alternative forms of operation and construction which remain within the scope of equivalent means also come within the broad purview of this patent.

We claim:
1. A process for stratifying a body of liquid in a bottom layer subjected to radioactive contamination and a top layer free of contamination comprising the steps of withdrawing liquid from the bottom layer, cooling a part of said withdrawn liquid and injecting said part of said withdrawn liquid into said bottom layer, withdrawing liquid from said top layer, forming a liquid mixture of said liquid withdrawn from said top layer and the remainder of said liquid withdrawn from said bottom layer, decontaminating said liquid mixture of radioactive contamination, bringing said liquid mixture to a temperature higher than the temperature of said part of said withdrawn liquid which is injected into said bottom layer and then injecting said liquid mixture into said top layer.

2. A process as described in claim 1, said bottom layer being at a higher temperature than said top layer and said liquid mixture which is injected into said top layer being heated to a temperature which is higher than that of said part of said withdrawn liquid which is introduced into said bottom layer by heat removed from said bottom layer.

3. Installation for stratifying a liquid body in a top layer and in a bottom layer containing radioactive contamination comprising an open vessel containing the liquid body, a first circulation system comprising means for withdrawing a first flow of liquid from a bottom portion of said vessel and means for returning the greater part of said first flow into said bottom portion, a second circulation system, communication means for delivering to said second circulation system the remainder of said first flow, said circulation system including means for withdrawing a second flow of liquid from a top portion of the vessel, means for mixing said second flow and said remainder of said first flow into a resultant flow, means for decontaminating said resultant flow of radioactive contamination and for returning said resultant flow into said top portion, heat exchange means for at least one of said two circulation systems for raising the temperature of said resultant flow above the temperature of said flow of liquid which is returned to said bottom portion.

4. An installation as described in claim 3, said heat exchanging means including a heat exchanger in each of said two circulation systems and means for transferring heat between said heat exchangers and for regulating the temperature difference between said flows of liquid delivered by said heat exchangers.

5. An installation as described in claim 3, said communication means including a tank, two compartments in said tank, each of said compartments forming a part of one of said circulation systems and a weir between said compartments for the overflow of liquid from said compartment of said first circulation system into said compartment of said second circulation system.

6. An installation as described in claim 3, the liquid body being water and nuclear radiation and heat emitting material being located in the bottom portion of the vessel and contaminating said bottom layer.

7. An installation as described in claim 6, said top layer having a depth which is at least equal to that which provides biological shielding against the nuclear radiation contamination present in said bottom layer.

8. An installation as described in claim 7, including a surface weir for withdrawing water from said top layer and for regulating the level of the body of water within the vessel.

References Cited by the Examiner

UNITED STATES PATENTS

| | | | |
|---|---|---|---|
| 2,873,243 | 2/1959 | Wigner et al. | 176—64 |
| 2,943,035 | 6/1960 | Kallman | 176—31 |
| 3,141,828 | 7/1964 | Steinert et al. | 176—62 |

FOREIGN PATENTS

| | | |
|---|---|---|
| 1,224,251 | 2/1960 | France. |

L. DEWAYNE RUTLEDGE, *Primary Examiner.*